May 3, 1966 G. W. GALLOWAY ETAL 3,248,790
APPARATUS AND METHOD FOR ASSEMBLING A MISSILE WARHEAD
Filed Feb. 21, 1956 2 Sheets-Sheet 1
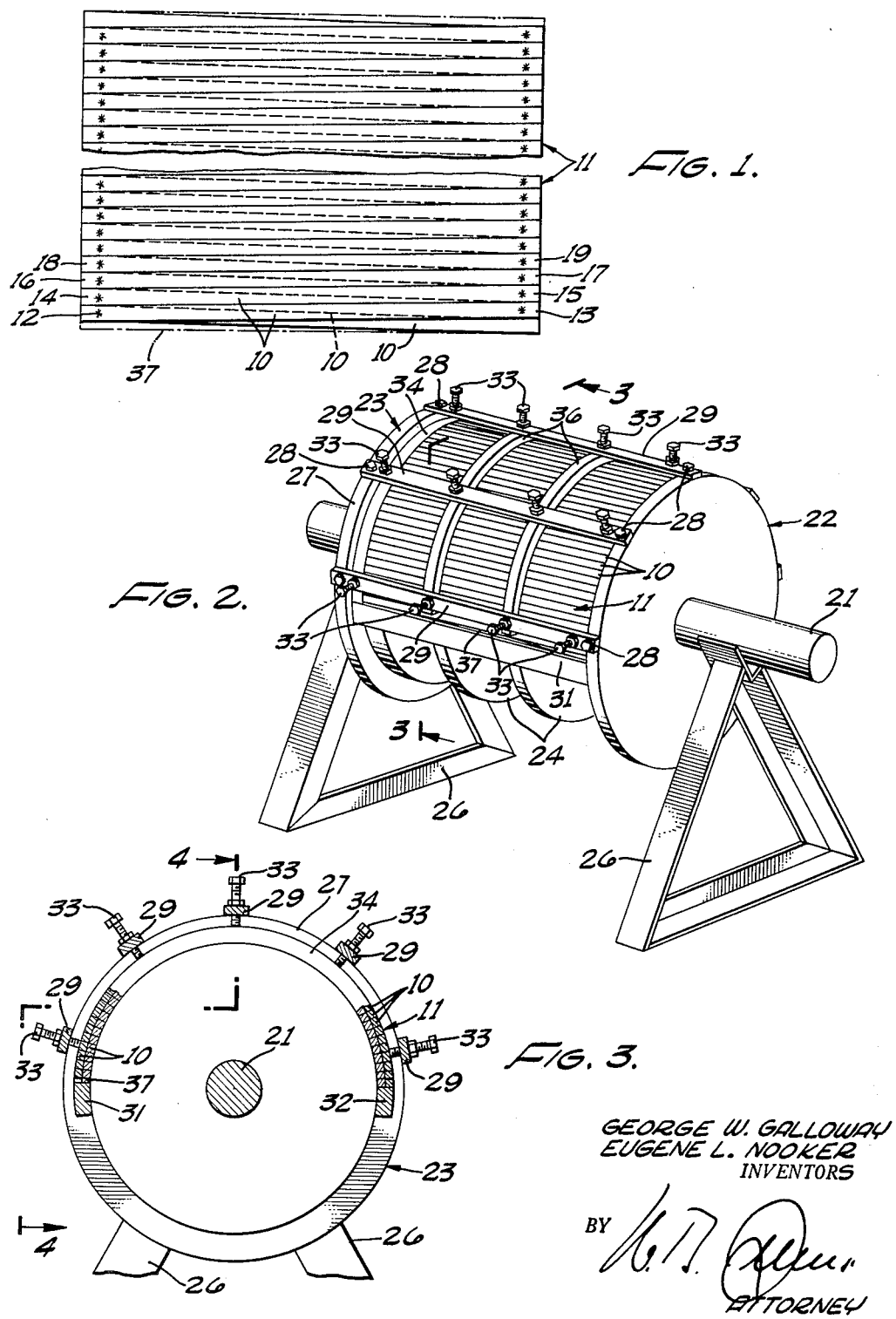
GEORGE W. GALLOWAY
EUGENE L. NOOKER
INVENTORS
BY
ATTORNEY

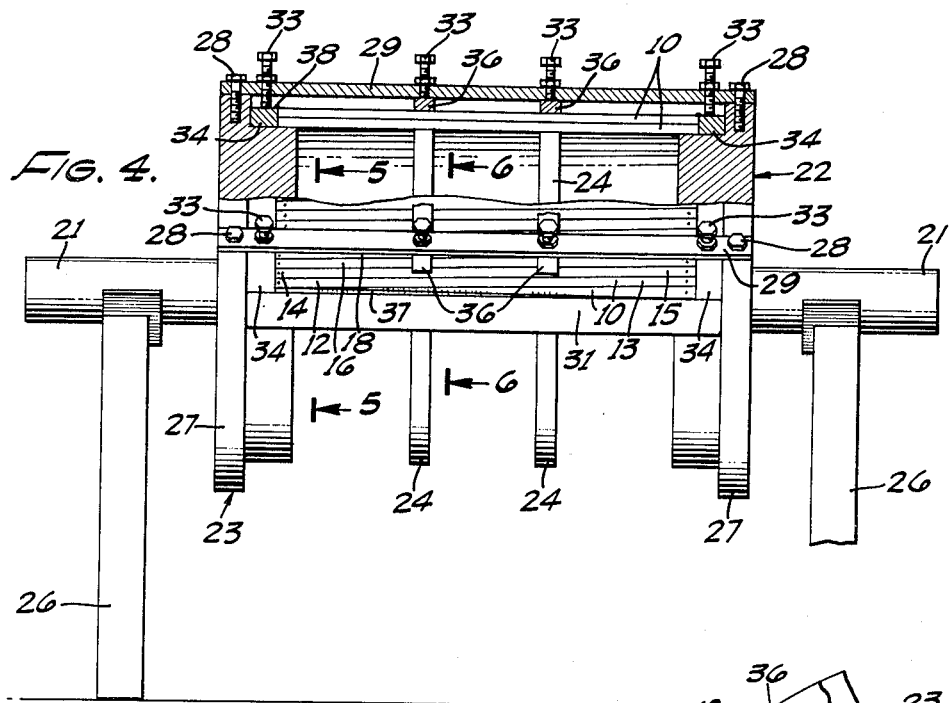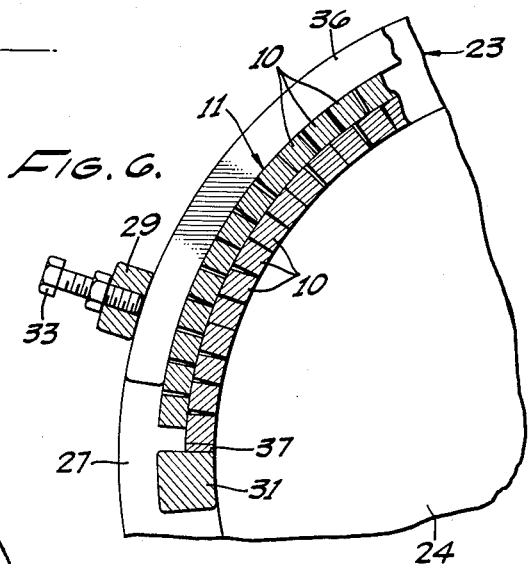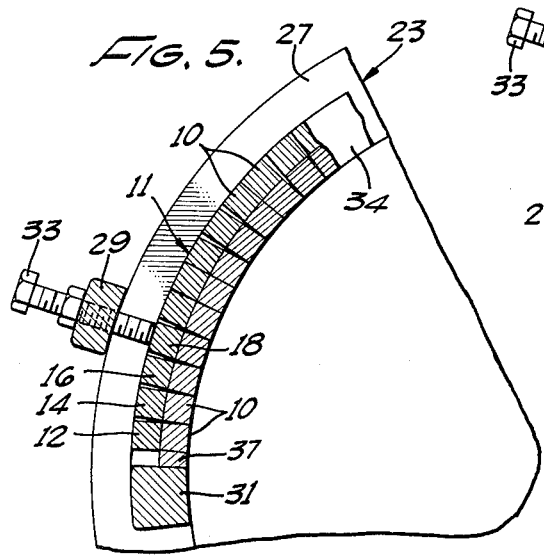

United States Patent Office 3,248,790
Patented May 3, 1966

3,248,790
APPARATUS AND METHOD FOR ASSEMBLING A MISSILE WARHEAD
George W. Galloway, Altadena, Calif., and Eugene L. Nooker, Silver Spring, Md., assignors to the United States of America as represented by the Secretary of the Navy
Filed Feb. 21, 1956, Ser. No. 568,420
3 Claims. (Cl. 29—471.1)

This invention relates to welding fixtures and methods and more particularly to an improved fixture and method for holding a double layer series of bars in an arcuate form for welding to arcuate end connector members to provide a flexible cylindrical structure free of non-uniform stress and distortion in the component bars thereof.

In co-pending applications Serial No. 541,862, filed October 20, 1955, and now abandoned, for Apparatus and Method for Positioning and Holding Bars During Welding Thereof Into Zigzag Series-Connected Relationship, inventor Arthur J. Wadsworth; and Serial No. 541,863, filed October 20, 1955, and now abandoned, for Method of Welding Non-Fragmentation Warheads for Missiles, Particularly Antiaircraft Missiles, inventor George W. Galloway; there are shown and described means and methods for assembling a plurality of bars or rods into a two-layer zigzag-connected element for use in a non-fragmentation warhead. Before actually being incorporated into such a warhead, the bank of bars must first be formed into a semi-cylinder and secured to arcuate end members as well as to side wedge shaped elements so that a perfect semi-cylindrical shape results. Two such semicylinders are then formed into a complete cylinder during final assembly of the warhead, and the explosive charge is disposed inside such cylinder.

In the previously known means and methods for effecting assembly of the zigzag-connected bars with the arcuate end members and side strips, the bank or nest of zigzag bars was forced into the desired shape by use of high pressures and the like, and was then welded to the end members and side strips. Such construction resulted, however, in the creation of very high distortion stresses which necessitated the use of special means to maintain the semi-cylinder in the desired shape after its removal from the assembly fixture and prior to the time of mounting into the missile.

In view of the above factors characteristic of the assembly of zigzag-connected bars with end members and side strips during the manufacture of a missile warhead, it is an object of the present invention to provide a step-by-step method and apparatus for effecting such assembly without the use of large forces and resultant distortion stresses to the end that the completed assembly will be uniform, undistorted and substantially free of inequalities in internal stresses.

These and other objects and advantages of the invention will be more fully set forth in the following specification and claims considered in connection with the attached drawings to which they relate.

In the drawings:
FIGURE 1 is a fragmentary plan view of a bank or nest of zigzag-connected bars or rods;
FIGURE 2 is a perspective view illustrating the fixture of the invention as having a bank of the bars of FIGURE 1 mounted therein, together with arcuate end members and side bars;
FIGURE 3 is a transverse sectional view taken along line 3—3 of FIGURE 2;
FIGURE 4 s a view, partially in side elevation and partially in vertical central section, taken along line 4—4 of FIGURE 3 and as viewed in the direction of the arrows;
FIGURE 5 is an enlarged fragmentary transverse sectional view taken along line 5—5 of FIGURE 4; and
FIGURE 6 is an enlarged fragmentary transverse sectional view taken along line 6—6 of FIGURE 4.

Referring to the drawings, assembled double layer bank of elongated steel bars or rods 10 is indicated at 11 in FIGURE 1 and is produced in the manner set forth in the above-cited co-pending applications, it being understood that the overlapping ends of all bars are welded together in series at the points indicated by the stars 12 in FIGURE 1. As previously indicated, the ends of the bars 10 in one layer are connected to the corresponding ends of the bars in the other layer in zigzag or accordion fashion, so that it is possible to stretch out the bank of bars into a long loop or half loop. A number of these series-connected bar ends are indicated at 12–19 in the drawings. Stated otherwise, the first series joint between an upper bar 10 and a lower bar 10 is indicated at 12, the next series joint is indicated at 13, etc.

The welding jig or fixture of the invention is shown in FIGURES 2–6, and may be seen to comprise generally an axle member 21 on which are fixedly mounted, in axially spaced relationship, corresponding right and left opposed end discs 22 and 23, respectively, and a pair of axially spaced center discs 24. The axle 21, and thus the discs 22–24, are rotatably supported on a pair of triangular supports 26 which may be anchored to the underlying supporting surface.

Right and left end discs 22 and 23 are provided at their outer portions, most remote from each other, with radially extending peripheral flanges 27, the latter being formed at circumferentially spaced points with threaded apertures to receive screws 28 which mount longitudinally extending hold-down bars 29 in position. Five of the hold-down bars 29 are shown in FIGURE 3 as mounted in equally spaced relation around the upper half of the discs 22 and 23 and between stop bars 31 and 32 which are permanently secured to the discs in diametrically opposed positions such that exactly half a circle is defined thereabove.

The hold-down bars 29 are each threaded to receive screws 33 which are adapted to press arcuate end members 34 and the arcuate hold-down bars 36 radially inwardly. The end members 34 are rectangular in section and rest on the outer peripheral surfaces of the bodies of end discs 22 and 23 in lateral abutment with flanges 27 thereof. The ends of the end members engage the upper surfaces of stop bars 31 and 32. The screws 33 which engage the end members 34 are maintained in position to clamp the end members 34 against discs 22 and 23 at all times during the assembly process, since these members form an integral part of the completed warhead provided by the curved bank of rods 11 and are only removed from the welding jig after the assembly has been welded.

The bank 11 of zigzag-connected bars or rods 10 is mounted with its end edges in abutment with the inner radial surfaces of end members 34, and resting on the bodies of end discs 22 and 23. The center portion of the bank 11 is disposed radially inwardly of hold-down bars 36 and is clamped in position against center discs 24 when the screws 33 associated therewith are tightened. The screws associated with hold-down bars 36 are loosened between each welding operation, as will be described subsequently, so that the hold-down bars 36 may be shifted to free successive pairs of bars 10 for accurate positioning of the bars before their ends are welded to the end members 34.

In carrying out the method of the invention with the above-described apparatus, the end members 34 are mounted over the body portions of end discs 22 and 23, and the two-layer bank 11 of bars 10 is mounted therebetween and in end-edge abutment with the radial side surfaces thereof as illustrated. The hold-down bars 29 are then mounted in position by means of the screws 28, and with the hold-down bars 36 disposed therebeneath. Screws 33 are then tightened to rigidly hold end members 34, as well as the central portion of the bank 11, in position. An elongated taper or wedge bar or rod 37, which may be termed a side bar, is then mounted with one side surface adjacent the upper edge of stop bar 31 and the other side surface in engagement with the adjacent bar or rod 10. Taper bar 37 is then welded to the end members 34, and serves the purpose of filling in the gap between the bank 11 of bars 10 and the stop bars 31 so that the resultant warhead will be perfectly semi-cylindrical and will not have tapered sides due to the zigzag-connected relationship of bars or rods 10.

Thereafter, the holding screws 33 for clamping or hold-down bars 36 are released, and the clamping bars 36 are shifted clockwise (as shown in FIGURE 6) about the axis of shaft 21 as a pivot point to expose the first pair of bars 10 so that such pair may be readily shifted by the hands of an operator to the extent necessary to align their transverse axes with a radius line through the axis of the cylindrical surface being formed by the bank of bars 11. Screws 33 for bars 36 are then retightened and a weld, preferably a short arc weld, 38 is made between the ends of the upper one of first pair of bars and the adjacent end member 34. This weld is not made, however, until the welding operator has manipulated the bar ends to their natural radial position, such as shown in FIGURE 5 and at which the transverse axes of the bars lie along radii emanating from the center of fixture shaft 21. There is thus no distortion stress created, such as would make the warhead spring out of shape when released from the fixture.

The initial welding operations having been completed, the screws 33 for hold-down bars 36 are again loosened and the bars 36 are shifted clockwise (FIGURE 6) to free the second pair 13 of bar ends for manipulation by the welder. Such second pair 13 is then accurately positioned along a radius of the fixture, as is desired in order to eliminate or minimize distortion stresses, after which it is welded to the adjacent end member 34 by a second weld corresponding to the one 38 shown in FIGURE 4. This process is repeated, with the hold-down bars 36 being successively released, shifted and retightened to effect successive release of the pairs of bar ends 14–19, etc. The hold-down bars 29 may be removed while welds are being made thereat.

After substantially the entire semi-cylinder has been welded to the end members 34 as indicated, a second taper or side bar is inserted generally diametrically opposite taper or side bar 37 (adjacent stop bar 32) to result in the formation of a perfect semi-cylindrical warhead after welding of such second taper bar to the end members 34. The screws 28 are then removed to permit removal of hold-down bars 29 and hold-down bars 36, after which the welded assembly comprising the bank 11 of bars 10, taper or side bars 37, and end members 34 is removed from the fixture for final assembly into the missile.

From the above it will be understood that the essence of the invention lies in the step-by-step freeing of each connected pair of bar ends 12–19, etc., and welding of the freed bar ends to the end members 34 in a perfect radial position resulting in minimized tendency of the welded structure to spring into a distorted position. Accordingly, when the welded structure is removed from the welding fixture, it remains a perfect semi-cylinder and need not be clamped or held in position during or after its assembly into the missile. This is to be contrasted with structures in which the bars 10 are merely forced into the desired shape in any fashion and are then welded, resulting in setting up of great stresses and distortion forces which necessitate special clamping means to hold the semi-cylinder in shape during and after its assembly into the missile.

While the particular method and apparatus herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

We claim:

1. An assembling and welding fixture for holding a zigzag bank of series-connected, elongated bars in juxtaposition to a pair of arcuate end members for making weld connections therebetween, which comprises a support, an axle rotatably mounted on said support, a pair of end discs fixedly mounted on said axle in spaced relationship, an upwardly extending arcuate flange means at the outer edge of each said end disc, at least one intermediate disc fixedly mounted on said axle intermediate said end discs, said intermediate disc and said end discs having the same diameter, a pair of stop bars mounted at each end upon the outer periphery of said end discs and extending between said arcuate flange means and parallel to said axle, said stop bars being spaced around the periphery of said end discs to define an arc between corresponding surfaces thereon, a plurality of straight hold-down bars mounted longitudinally of said axle and removably secured at each end to said flange means, a rigid arcuate hold-down bar mounted radially outwardly of said intermediate disc, the radius of curvature of the outer peripheries of said arcuate hold-down bar and said arcuate flange means being substantially the same, first means on said straight hold-down bars to bring pressure to bear on a pair of arcuate end members to be held by said fixture, one of said end members to be held being disposed upon each of said end discs adjacent said flange, and second means on said straight hold-down bars to move said rigid arcuate hold-down bar toward said intermediate disc to thus clamp therebetween a zigzag bank of series-connected bars to be held by said fixture, said bank of bars to be held being disposed to extend between said arcuate end members and being laid about said end discs and said intermediate disc within the arc defined by said stop bars, said second means being adapted to be alternately loosened and tightened whereby to release said arcuate hold-down bar for selective freeing of pairs of said zigzag-connected bars during welding thereof to said arcuate end members.

2. The invention as claimed in claim 1, in which the arc defined between corresponding surfaces of said stop bars is a 180° arc, and in which said arcuate hold-down bar is substantially semi-circular.

3. A method of securing the end portions of a two-layer zigzag bank of series-connected, elongated, rectangular in cross-section metal bars to a pair of arcuate metal end members to thereby form a section of a cylinder, which comprises clamping said arcuate end members in aligned, parallel, spaced apart positions, said end members being spaced apart a distance slightly greater than the length of said bars, clamping in position between said end members all of said bank of bars except for a small number of bars at one side thereof, the longitudinal axes of said bars lying generally parallel to the longitudinal axis of said cylinder, manipulating said free bars to align the opposite ends thereof with said end members and to cause the transverse axes of said bars to lie along radii emanating from the longitudinal axis of said cylinder, welding the opposite ends of said free bars to said end members, freeing additional ones of said bars adjacent said welded bars, manipulating said additional bars into position for welding with the opposite ends thereof aligned with said end members and with the transverse axes thereof lying along radii of said cylinder, welding said additional bars to said end members, and sequentially freeing, manipulating and welding further additional bars until the entire bank is welded to said end members.

References Cited by the Examiner

UNITED STATES PATENTS

| | | | |
|---|---|---|---|
| 224,758 | 2/1880 | Wright | 153—32 XR |
| 1,035,254 | 8/1912 | Smith | 113—99 |
| 2,020,830 | 11/1935 | Gray | 113—99 |
| 2,437,259 | 3/1948 | Kantz | 153—32 XR |
| 2,768,597 | 10/1956 | Smith | 29—287 |

FOREIGN PATENTS 821,527  8/1937  France.

JOHN F. CAMPBELL, *Primary Examiner.*

ARTHUR M. HORTON, SAMUEL BOYD, SAMUEL FEINBERG, *Examiners.*

F. J. LEES, *Assistant Examiner.*